US009236982B2

(12) United States Patent
Li et al.

(10) Patent No.: US 9,236,982 B2
(45) Date of Patent: Jan. 12, 2016

(54) PDSCH RESOURCE ELEMENT MAPPING FOR THREE-CELL JOINT TRANSMISSION

(71) Applicant: Intel Corporation, Santa Clara, CA (US)

(72) Inventors: Qinghua Li, San Ramon, CA (US); Yuan Zhu, Beijing (CN); Xiaogang Chen, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 375 days.

(21) Appl. No.: 13/725,369

(22) Filed: Dec. 21, 2012

(65) Prior Publication Data

US 2014/0177541 A1 Jun. 26, 2014

(51) Int. Cl.
 H04W 72/04 (2009.01)
 H04L 5/00 (2006.01)
 H04L 27/36 (2006.01)

(52) U.S. Cl.
 CPC .............. *H04L 5/0035* (2013.01); *H04L 5/005* (2013.01); *H04L 5/0023* (2013.01); *H04L 5/0073* (2013.01); *H04L 27/362* (2013.01)

(58) Field of Classification Search
 USPC ......................................................... 370/329
 See application file for complete search history.

(56) References Cited

U.S. PATENT DOCUMENTS

2011/0199986 A1* 8/2011 Fong ..................... H04L 5/0035 370/329
2011/0243191 A1* 10/2011 Nakao ................. H04J 11/0053 375/133
2012/0113816 A1* 5/2012 Bhattad ................. H04L 5/0032 370/246
2013/0058296 A1* 3/2013 Jitsukawa ......... H04W 72/0426 370/329
2013/0250864 A1* 9/2013 Zhang ................. H04W 72/042 370/329

FOREIGN PATENT DOCUMENTS

WO 2012-103946 A1 8/2012

OTHER PUBLICATIONS

Xie et al. A Novel Method to Solve CRS/PDSCH RE Collision in Join Transmission in LTE-A, Dec. 16, 2012, IEEE DOI 10.1 109/CCVE. 2012.20.*
International Preliminary Report on Patentability for PCT Application No. PCT/US2013/048489, mailed on Jul. 2, 2015, seven pages.

(Continued)

*Primary Examiner* — Redentor Pasia
(74) *Attorney, Agent, or Firm* — Carrie A. Boone P.C.

(57) ABSTRACT

A PDSCH resource element mapping method is used for joint transmissions. The method solves a problem of colliding resource elements in joint transmissions, due to interference caused when PDSCH resource elements are transmitted in the resource block of one cell and cell-specific reference signals (CRSs) are transmitted in the same location of the resource block of an adjacent cell. The method is particularly beneficial for coordinated multipoint (CoMP) transmissions. The PDSCH resource element mapping method employs one of three schemes for transmitting the collided resource elements, with minimal interference. In the first scheme, one PDSCH symbol is transmitted over three consecutive CRS-collided PDSCH resource elements. In the second scheme, two PDSCH symbols are transmitted over three consecutive CRS-collided PDSCH resource elements. In a third scheme, CRS-collided resource elements are transmitted using a lower modulation order than is specified by the modulation and coding scheme.

5 Claims, 11 Drawing Sheets

(56) References Cited

OTHER PUBLICATIONS

Intel Corporation, "CRS/PDSCH RE collision resolution in Joint Transmission", R1-123175, 3GPP TSG RAN WG1 Meeting #70, Qingdao, China, Aug. 13-17, 2012 (8 pages).

Etri, "CRS pattern indication and PDSCH RE mapping in multi-cell JP CoMP", R1-123753, 3GPP TS RAN WG1 Meeting #70, Qingdao, China, Aug. 13-17, 2012 (3 pages).

Intel Corporation, "Analysis of CRS and PDSCH collisions in Scenarios 3 and 4", R1-112226, 3GPP TSG-RAN WG1 #66, Athens, Greece, Aug. 22-26, 2011 (6 pages).

* cited by examiner

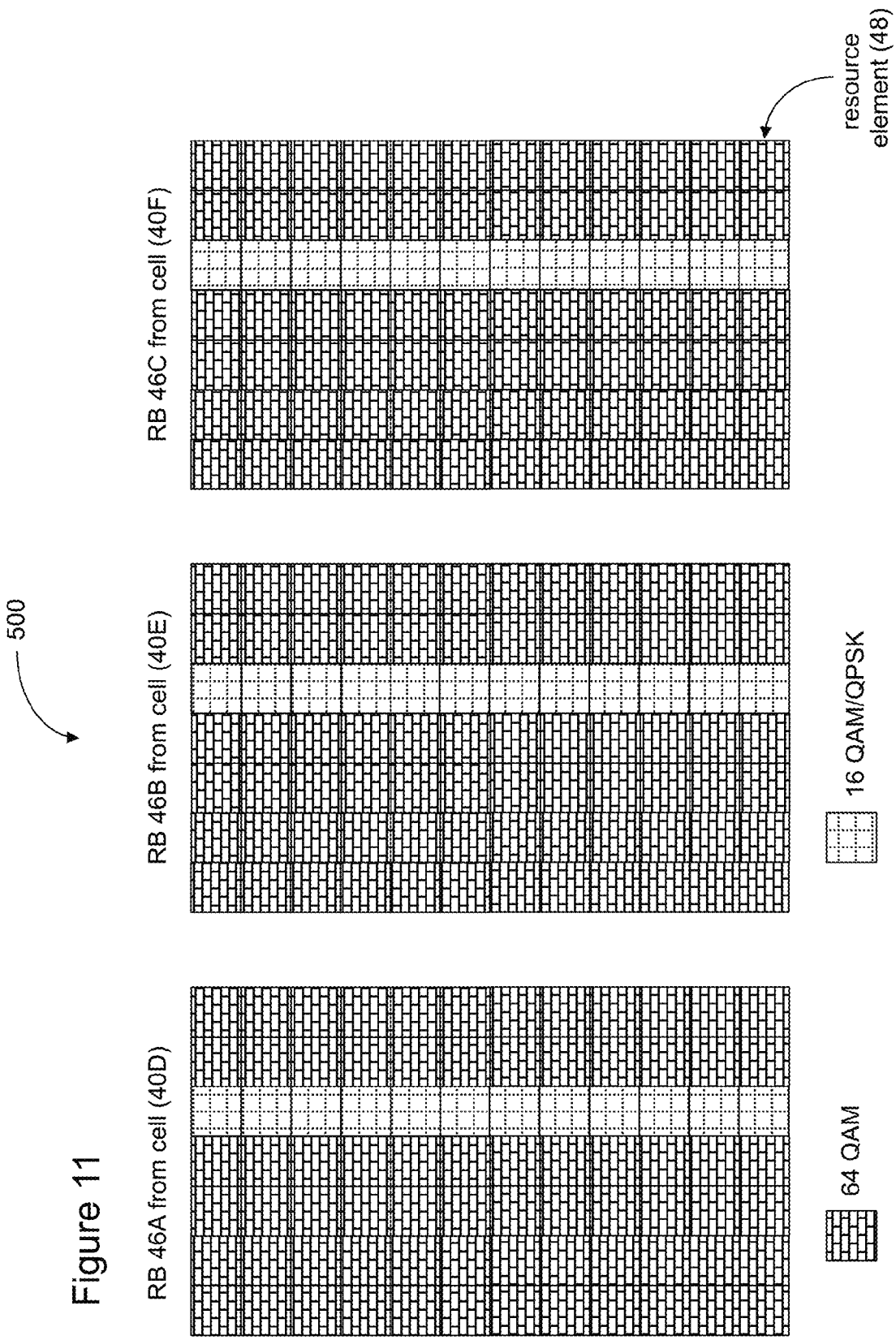

PDSCH RESOURCE ELEMENT MAPPING FOR THREE-CELL JOINT TRANSMISSION

TECHNICAL FIELD

This application relates to coordinated multipoint transmission, joint transmission, and cell-specific reference signal (CRS) interference cancellation (IC).

BACKGROUND

The third generation partnership project (3GPP) and long-term evolution (LTE) standards are orthogonal frequency division multiplexing (OFDM) technologies. In addition, the LTE physical layer (PHY) uses orthogonal frequency divisional multiple access (OFDMA) on the downlink and single carrier frequency division multiple access (SC-FDMA) on the uplink.

OFDMA is used to multiplex different users with time-frequency resource allocation in the same transmission frame. Each user is allocated one or more sub-channels made up of a fixed number of narrowband subcarriers. Because they are orthogonal to one another, interference levels are generally low between subcarriers in a single cell/sector.

Despite the benefits of orthogonality, where the same subcarriers are in the same time slots within nearby cells/sectors, collisions (interference) may occur. Fractional frequency reuse (FFR) is one mechanism to address the interference. FFR distinguishes cell edge users from cell center users by providing cell edge users with more transmission bandwidth, more power, or both.

The transmission channel is divided into multiple subcarriers, which allows data to be transmitted in parallel streams. A downlink signal to be transmitted is schematically depicted using a two-dimensional resource block made up of the subcarriers (frequency) and OFDM symbols (time). An individual unit of the resource block is known as a resource element (RE). The resource element thus represents one subcarrier for sending data over one symbol period. The term physical resource block (PRB) is used in both the uplink and downlink, with RB being a shorthand version of PRB.

The resource elements can be assigned individually to different users in a cellular network. This allows data to be simultaneously sent to or received from the different users, subcarrier-by-subcarrier, for the designated symbol periods, by a single base station (eNB).

Under LTE, the resource block consists of twelve subcarriers per slot, where a slot is 0.5 milliseconds in duration, and two slots make up a subframe. Each resource element within the resource block grid represents a single subcarrier for one symbol period. For eNBs and user equipment having multiple antennas, or multiple-input-multiple-output (MIMO) applications, the transmitting antennas may send signals simultaneously within the resource block.

Before data transmission can take place between the eNB and user equipment (UE), the channel between them must be characterized. To characterize the channel, each eNB in the cellular network periodically sends synchronization signals and reference signals to the one or more UEs within its cell region. The synchronization signals provide network timing information, while the reference signals help to determine a channel impulse response. Another channel characterization process, known as "sounding", involves the transmission of sounding packets to the user equipment.

Reference signals are embedded in the resource blocks in predetermined locations. For example, under the LTE specification, reference signals in the downlink are transmitted during the first and fifth OFDM symbols of each slot when a short cyclic prefix is used and during the first and fourth OFDM symbols when a long cyclic prefix is used. Reference symbols are also transmitted every sixth subcarrier and are staggered in both time and frequency. The reference signals are known to both the eNB and to the user equipment. A reference signal is assigned to each cell within a network and acts as a cell-specific identifier.

For the subcarriers (resource elements) bearing reference signals, the channel response is computed directly, while the channel response for the other subcarriers is interpolated. Where the eNB has multiple antennas, the reference signals may be transmitted sequentially from each antenna port that is formed by multiple antennas.

Two channels used in downlink LTE are the physical downlink shared channel (PDSCH) and the physical downlink control channel (PDCCH). The shared channel, PDSCH, transmits the data while the control channel, PDCCH, indicates user equipment-specific information. The PDCCH is mapped onto resource elements in up to the first three OFDM symbols in the first slot of the resource block.

For eNBs having two or more antennas, transmit beamforming may be used for improved throughput. Where the channel characteristics between the eNB and the user equipment are known, the phases of the transmit signals on each antenna may be coordinated so as to constructively combine at the user equipment antenna.

Under the LTE standard, the user equipment is configured in one of several different transmission modes, which defines how to process data transmissions received on the PDSCH. There are nine transmission modes under the most recent version of the standard, and the transmission mode is selected based on the capabilities of both the eNB and the user equipment.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 11 is a block diagram illustrating the third scheme of the PDSCH resource element mapping method of FIG. 1, according to some embodiments.

DETAILED DESCRIPTION

In accordance with the embodiments described herein, a PDSCH resource element mapping method is used for joint transmissions. The method solves a problem of colliding resource elements in joint transmissions, due to interference caused when PDSCH resource elements are transmitted in the resource block of one cell and cell-specific reference signals are transmitted in the same location of the resource block of an adjacent cell. The PDSCH resource element mapping method employs one of several schemes for transmitting the collided resource elements, with minimal interference.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
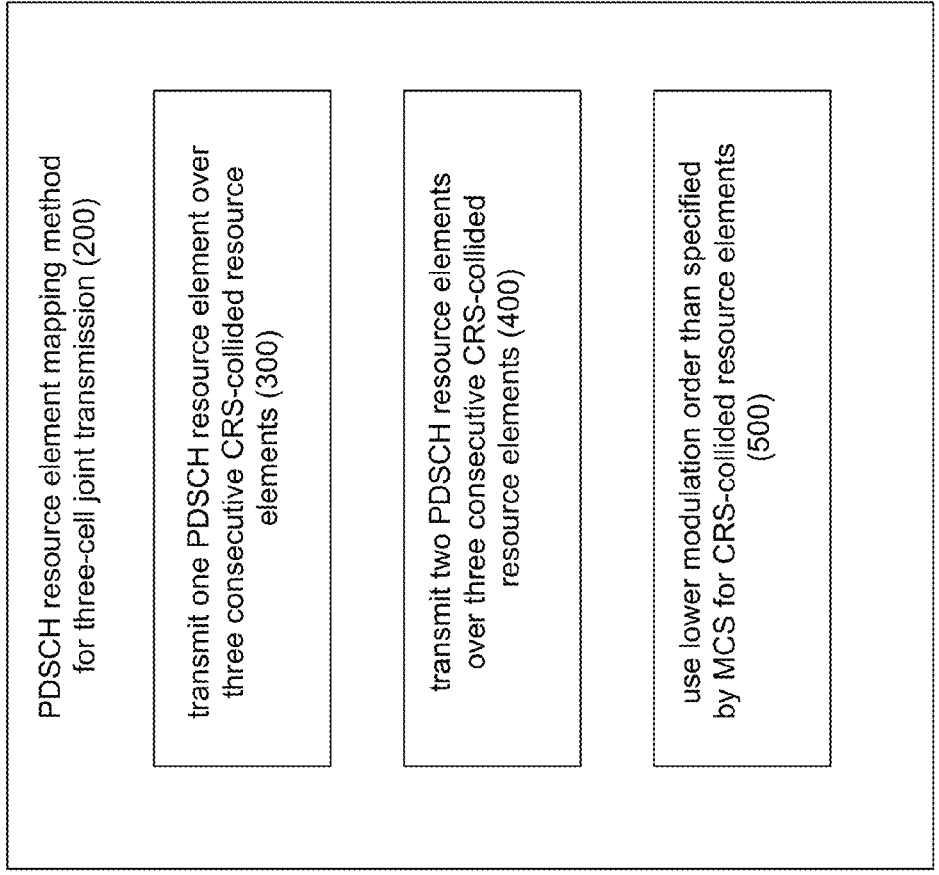
FIG. 1 is a simplified block diagram of a PDSCH resource element mapping method for three-cell joint transmission, according to some embodiments.
Figure 7:
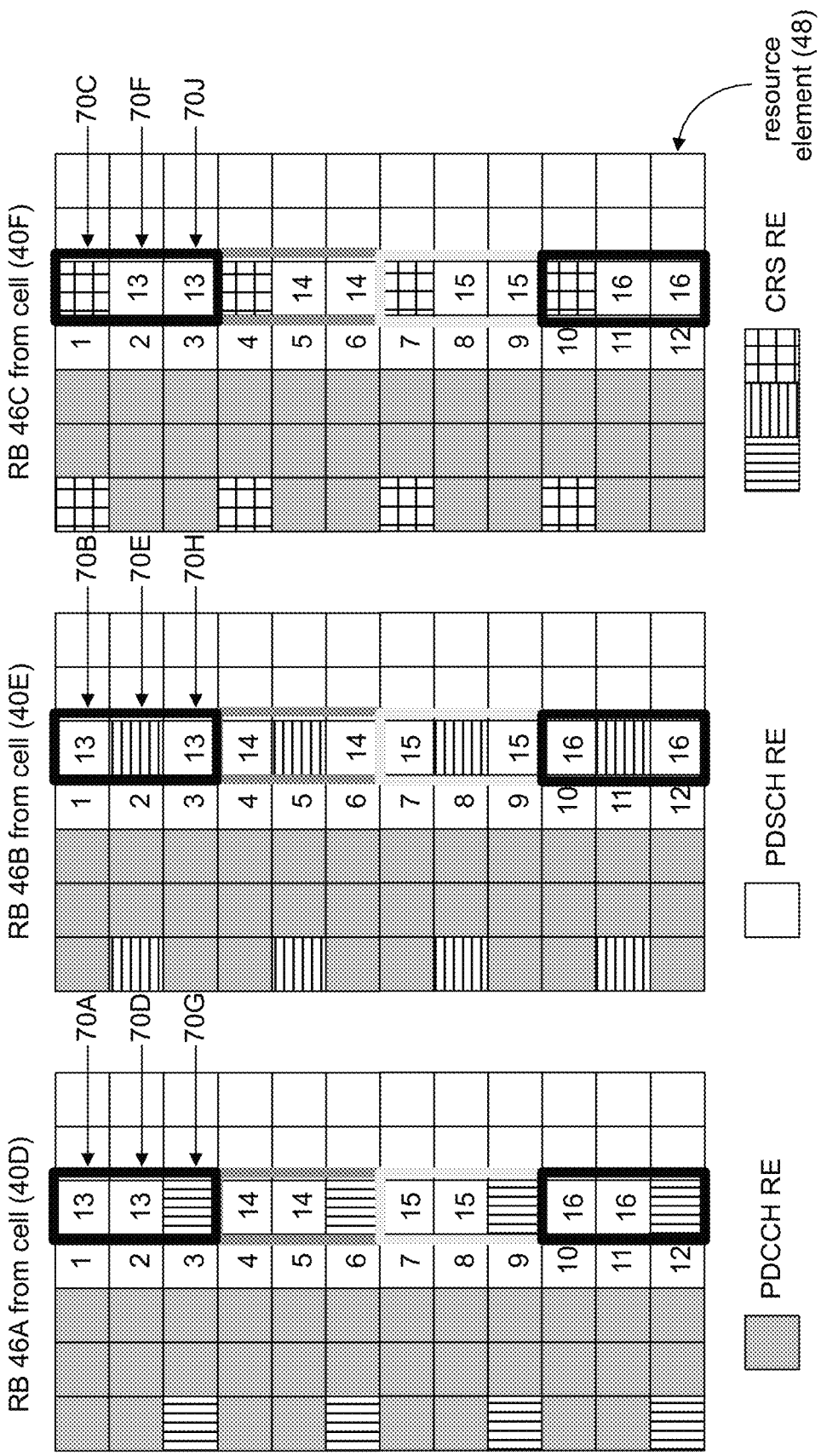
FIG. 7 is a block diagram showing the first scheme of the PDSCH resource element mapping method of FIG. 1, according to some embodiments.
Figure 8:
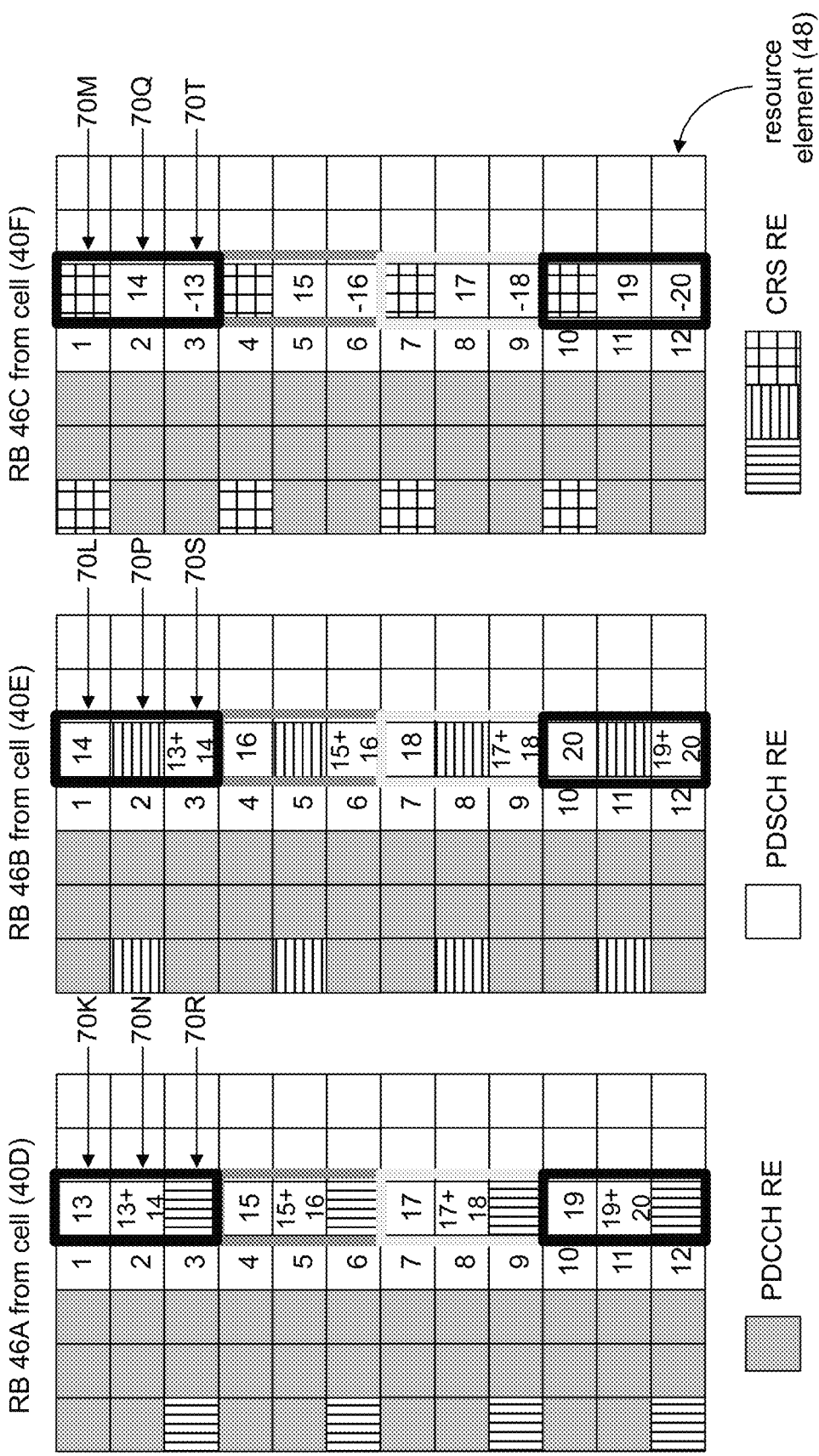
FIG. 8 is a block diagram showing the second scheme of the PDSCH resource element mapping method of FIG. 1, according to some embodiments.

FIG. 1 is a simplified block diagram of a PDSCH resource element mapping method 200 for three-cell joint transmission, according to some embodiments. The method 200 includes three different schemes 300, 400, and 500, for addressing the problem of collided resource elements that cause interference for user equipment. The first scheme 300 involves the transmission of a single PDSCH resource element over three consecutive cell-specific reference signal-collided (CRS-collided) resource elements. The first scheme 300 is illustrated in FIG. 7, below. The second scheme 400 involves the transmission of two PDSCH resource elements over three consecutive CRS-collided resource elements. The second scheme 400 is illustrated in FIG. 8, below. The third scheme 500 involves selectively modifying the modulation order for some resource elements to address interference of user equipment. The third scheme 500 is illustrated in FIG. 11, below. Before describing the schemes 300, 400, 500 in detail, some background on coordinated multipoint (CoMP) transmissions and joint transmission are first introduced.

Figure 2:
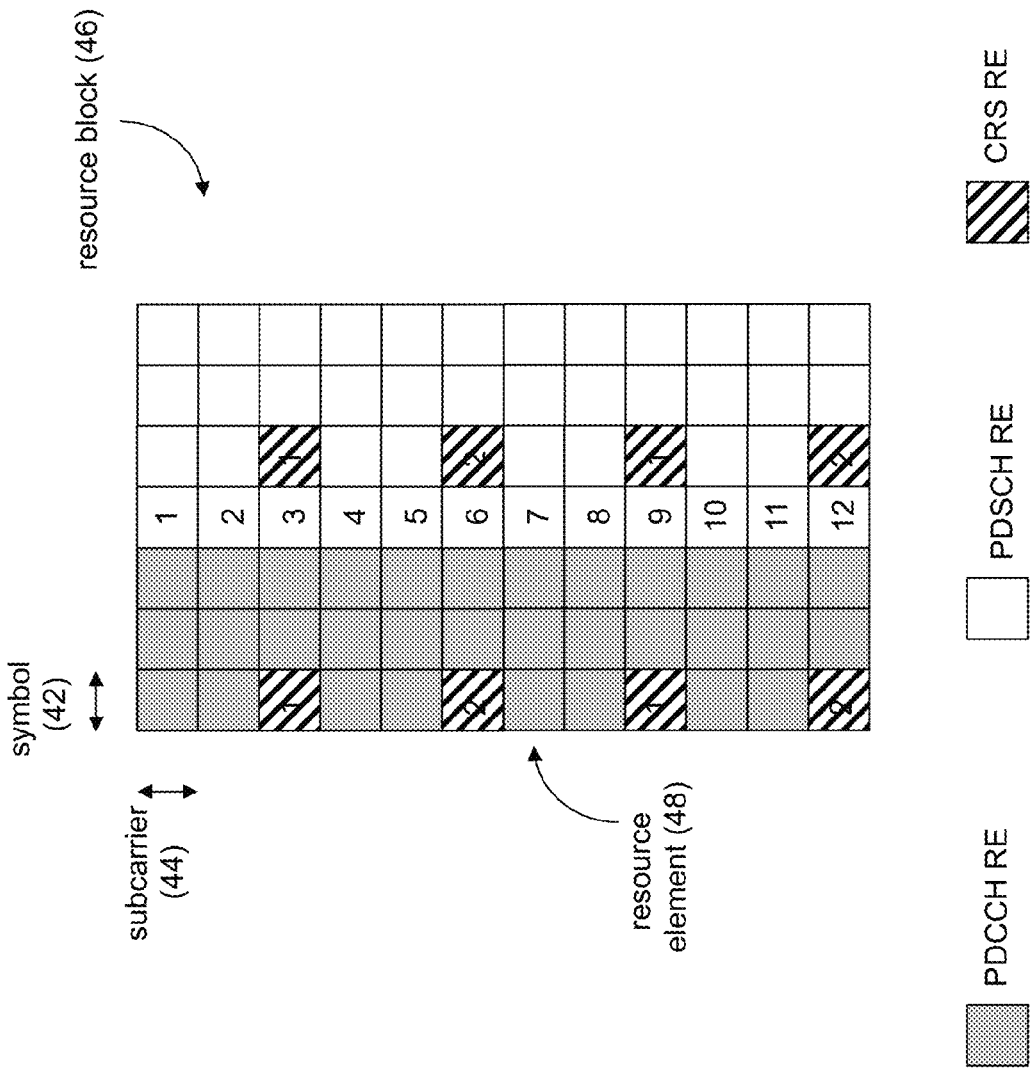
FIG. 2 is a block diagram showing a resource block, according to some embodiments.

FIG. 2 is a block diagram showing how the available downlink bandwidth is divided into physical resource blocks (RBs) under LTE and 3GPP. A single resource block 46 occupying a downlink subframe, is divided into two slots, a first downlink slot and a second downlink slot, with only the first slot being shown in FIG. 2. The resource block 46 consists of two sets of twelve consecutive subcarriers 44 and seven symbols 42, and is used for short cyclic prefix transmissions. Other resource blocks may be used for long cyclic prefix transmissions (not shown). The long cyclic prefix resource blocks consist of two sets of twelve consecutive subcarriers 44 and six symbols 42. The resource block is the smallest element of resource allocation assigned by the eNB scheduler. In the resource blocks 46 being depicted herein, only the first downlink slot is included.

A cell identifier defines the position of a cell-specific reference signals (CRS) in the downlink subframe. The first downlink slot of the resource block 46 includes PDCCH resource elements (gray) while the second downlink slot (not shown) has no PDCCH REs. Both downlink slots include CRS resource elements (left diagonal lines). In the first resource block 46, the CRS resource elements are located in the first and the fifth symbol positions. (For long cyclic prefix transmissions, the first and the fourth symbol positions are populated with CRS resource elements.) In some embodiments, the total number of resource elements 48 that are available for PDSCH transmission in the resource block (long cyclic prefix) is 96, 32 for the first downlink slot (36 available PDSCH slots minus four CRS slots) and 64 for the second downlink slot (72 available PDSCH slots minus eight CRS slots). Where the short cyclic prefix is used, 120 resource elements 48 are available for PDSCH transmission in the resource block 44 for the first downlink slot and 76 for the second downlink slot, in some embodiments.

In the following examples, only short cyclic prefix resource blocks are depicted. However, the principles described herein may readily be applied to resource blocks having long cyclic prefixes. Further, only the first downlink slot of the resource block is used to illustrate the principles of the PDSCH resource element mapping method 200. System designers of ordinary skill in the art will recognize that the principles described herein may be applied to transmissions involving the second downlink slot.

Further, the illustrations of the resource block (FIGS. 2, 4-7, and 10-11) depict PDCCH REs, PDSCH REs, and CRS REs in a particular arrangement. However, the principles of the PDSCH resource element mapping method 200 is not limited to the particular arrangements of resource blocks illustrated herein, but may be applied to other resource blocks having other characteristics.

As shown in FIG. 2, the smallest unit of the resource block 46 is the resource element 48, which carries a single data or training symbol 42 on a given subcarrier 44. The resource elements 48 making up the resource block 46 may be assigned individually to different user equipment in a cellular network. This allows data to be simultaneously sent to or received from the different users, subcarrier-by-subcarrier, for the designated symbol periods.

Figure 3:
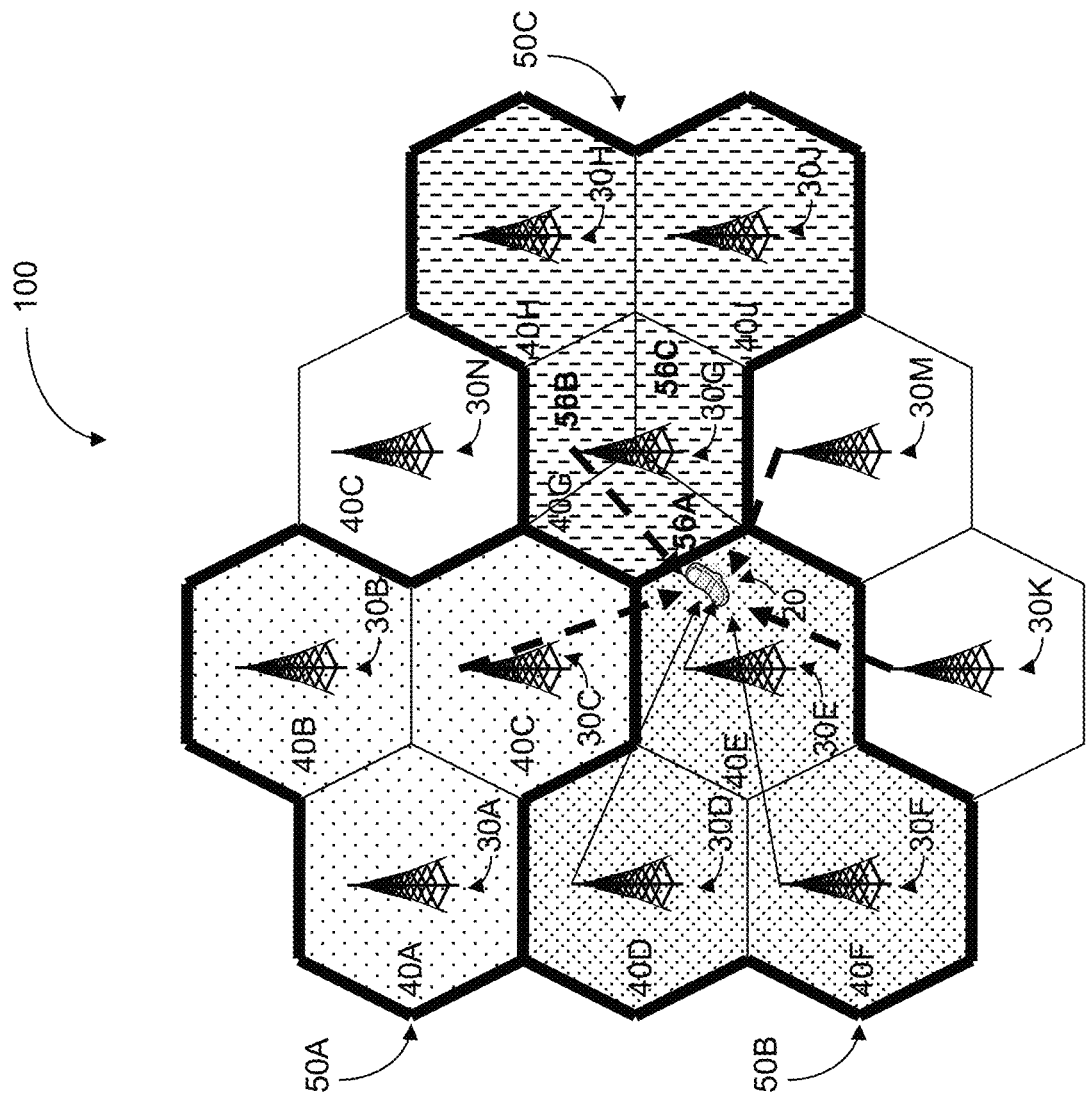
FIG. 3 is a simplified diagram of a wireless neighborhood in which cells are combined for coordinated multipoint and joint transmission operations, according to some embodiments.

In conventional multi-cell systems, users at the cell edge suffer from high inter-cell interference and are not able to achieve high throughputs because of their low signal-to-interference plus noise ratio (SINR). FIG. 3 shows a wireless neighborhood 100 having multiple cellular regions or cells 40A-40N (collectively, "cells 40"), each cellular region being serviced by an eNB. eNBs 30A-30N occupy the wireless neighborhood 100 (collectively, "eNBs 30"). Each cell 40 may further be divided into sectors, in which each cell has three sectors and the associated eNB for the cell serves all three sectors. In FIG. 3, cell 40G is further divided into sectors 56A, 56B, and 56C. User equipment located in the three sectors 56A, 56B, and 56C are serviced by the eNB 30G.

User equipment 20, such as a mobile device, a laptop computer, or other wireless technology, while moving through the wireless neighborhood 100, is occasionally located at the edge of a cellular region 40. Although the UE 20 is serviced by the eNB 30E, when at the edge of the center cellular region 40, the UE 20 may experience interference from eNBs located in several of the surrounding cellular regions, namely, from eNBs 30K, 30M, 30G, and 30C (with the interfering signals denoted with thick dashed lines). User equipment located at the edge of the cell 40 thus may experience high inter-cell interference, which, in turn, causes low throughputs because of a low SINR.

Cooperative multiple point (CoMP) transmission is used to enhance system performance in advanced cellular systems. Joint processing, a transmission scheme used in CoMP, involves coordination between multiple eNBs that are simultaneously transmitting to or receiving from the user equipment (UE). The wireless neighborhood 100 of FIG. 3 also illustrates the principle of inter-cell interference. Inter-cell interference occurs when the user equipment 20 experiences interference from eNBs outside its relevant cell, that is, eNBs that are not the user equipment's home eNB. To remove inter-cell interference and increase the capacity of the network, network multiple-input-multiple-output (MIMO), also known as coordinated multi-point transmission (CoMP), may be used. Under CoMP, a limited number of neighboring cells form a cluster (CoMP set), and the eNBs in the newly formed cluster perform joint coordination or pre-coding to serve users in the cluster by exchanging information through a backhaul.

The wireless neighborhood 100 in FIG. 3 consists of a series of clusters or CoMP sets 50, according to some embodiments, in which neighboring cells 40 form clusters 50 of size three. Three neighboring cells 40A, 40B, and 40C form cluster 50A (dotted), neighboring cells 40D, 40E, and 40F form cluster 50B (dotted cross-hatched), and neighboring cells 40G, 40H, and 40J form cluster 50C (vertical dashed). The UE 20 is located at the edge of the cluster 50B.

User equipment 20 entering into the cluster 50B is serviced by joint coordination of each of the eNBs 30D, 30E, and 30F. Although the user equipment 20 is jointly serviced by the three eNBs, one of the eNBs remains the designated "home" eNB. The home eNB is generally the eNB that is closest to the user equipment (e.g., the one having the lowest path loss from the user equipment). In FIG. 3, the home eNB of the UE 20 is eNB 30E.

Under CoMP, the UE 20 estimates its channel direction to different eNBs 30 by measuring reference signals transmitted from different eNBs 30 in the cluster 50 and feeds back the measured information to its home eNB 30E by using an appropriate pre-coding matrix indicator (PMI). Moreover, the UE 20 measures the channel quality from different eNBs by estimating the SINR and reports the appropriate channel quality indicator (CQI) to its home eNB 30E.

The eNBs 30D, 30E, and 30F in the cluster 50B cooperate and transmit a useful signal to the UE 20 (black arrows) while the eNBs 30C, 30G, 30K, and 30M in the neighboring clusters transmit interfering signals to the UE 20 (thick dashed arrows) and are thus likely to cause inter-cluster interference to the mobile device.

There are four scenarios defined for CoMP evaluation. Each of these scenarios involves user equipment located at the edge of a cell. In scenario one, the three collocated eNBs serving the three sectors of each cell form a CoMP cluster. This scenario is illustrated in FIG. 3. In scenario two, nine nearby eNBs form a CoMP cluster. Namely, the coverage of each CoMP cluster is about three times larger than that of scenario one. In FIG. 3, for example, the clusters 50A, 50B, and 50C may form such a CoMP cluster. In scenario three, one macro (large) eNB and four pico (small) eNBs of each sector form a CoMP cluster. In these three scenarios, each eNB has a different cell ID that results in a different CRS frequency shift. In scenario four, the CoMP cluster is formed the same way as in scenario three, except that the whole cluster shares the same cell ID. Three of the four scenarios involve different transmission points having different cell identifiers (IDs).

Figure 4:
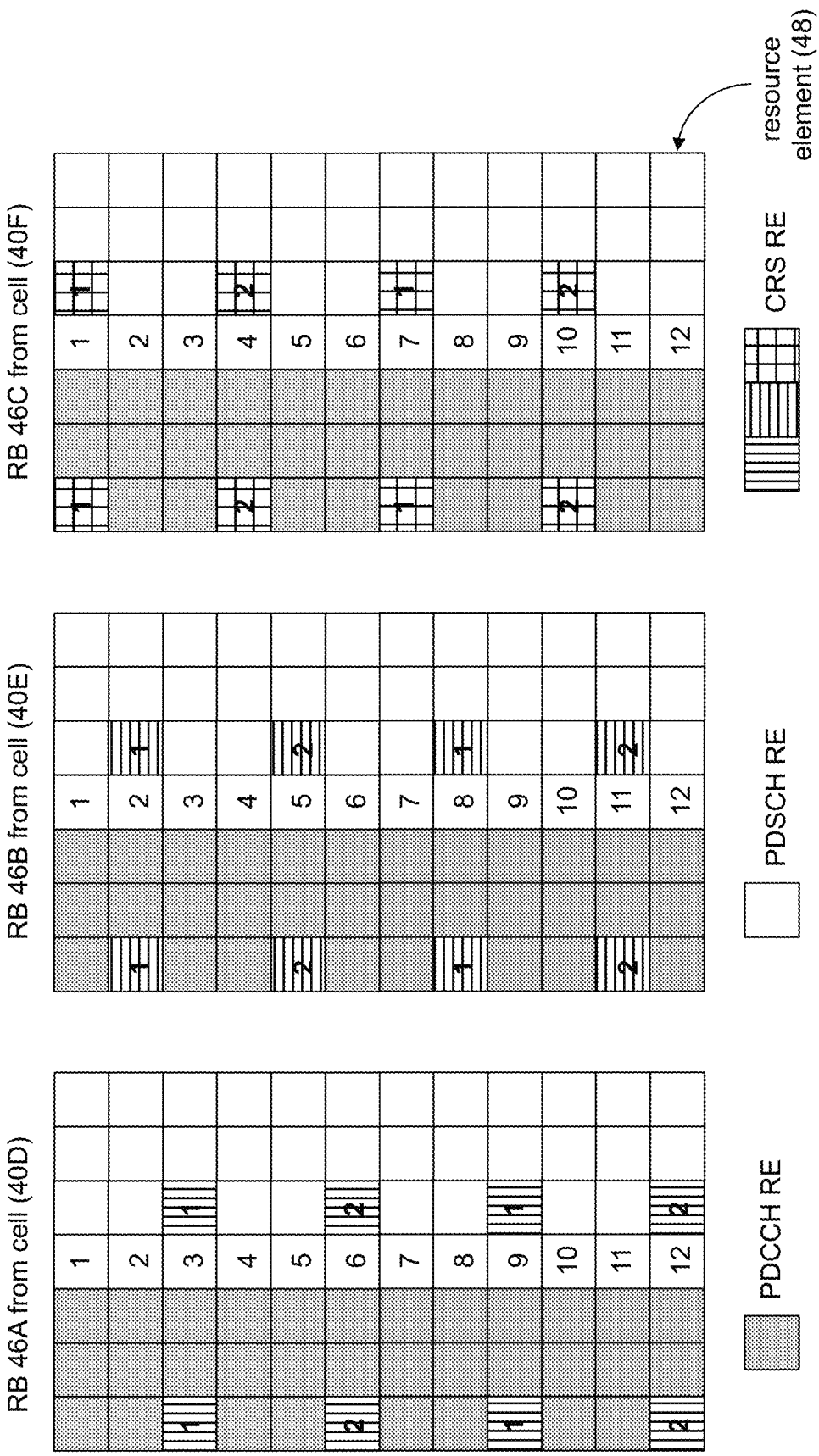
FIG. 4 is a block diagram of three resource blocks used by three different cells conducting joint transmission, used to illustrate collided resource elements, according to some embodiments.

FIG. 4 is a diagram used to illustrate three-cell joint transmission, according to some embodiments. The following examples assume that the user equipment 20 is traveling through cluster 50B in the wireless neighborhood 100 of FIG. 3, where cluster 50B consists of cells 40D, 40E, and 40F, which are serviced by eNBs 30D, 30E, and 30F, respectively. Each joint transmission cell has two CRS (antenna) ports and three frequency shifts for the three different joint transmission cells. One antenna port may use multiple resource elements per slot. Only the first downlink slot is shown of each resource block 46A, 46B, 46C, with resource block 46A being transmitted by eNB 30D in cell 40D, resource block 46B being transmitted by eNB 30E in cell 40E, and resource block 46C being transmitted by eNB 30F in cell 40F.

In the RB 46A, there are eight CRS REs (vertical lines) in the slot. In one scenario, the eight REs are shared by two ports, with one antenna port using four CRS REs per slot and eight CRS REs per subframe 54, with the remainder of the CRSs being used by the second slot. In the RB 46A, the CRS REs are denoted as "1" for the first antenna port and "2" for the second antenna port.

In the RB 46B, there are eight CRS REs (horizontal lines) in the slot, which are frequency shifted by one RE 48 relative to the CRS REs (vertical lines) of the RB 46A. The eight CRS REs are shared by two antenna ports, denoted as "1" and "2", with each antenna port using four CRS REs per slot and eight REs per subframe 54, four for each slot. In the RB 46C, there are eight CRS REs (checkerboard lines) in the slot, also frequency shifted by one RE 48 relative to the CRS REs (horizontal lines) of the RB 46B. The eight CRS REs are shared by two antenna ports, denoted as "1" and "2", with each antenna port using four CRS REs per slot and eight REs per subframe 54, four for each slot.

In cluster or CoMP set 50B, the eNB 30D in cell 40D transmits the resource block 46A to all UEs in its cell 40D; the eNB 30E in cell 40E transmits the resource block 46B to all UEs in its cell 40E; and the eNB 30F in cell 40F transmits the resource block 46C to all UEs in its cell 40F. Further, under coordinated multipoint transmission (CoMP), all three resource blocks 46A, 46B, and 46C are simultaneously transmitted by the eNBs 30D, 30E, and 30F, occupying the respective cells 40D, 40E, and 40F. Thus, in addition to the UE 20 receiving the three RBs 46A, 46B, and 46C from the three eNBs 30D, 30E, and 30F, other UEs in the CoMP set 50 also receive the three RBs shown in FIG. 4.

As illustrated in FIG. 4, the resource blocks 46 consist of different types of resource elements (REs) 48. Cell-specific reference signals (CRSs), denoted in vertical lines for cell 40D, in horizontal lines for cell 40E, and in checkerboard lines for cell 40F, occupy frequency-shifted locations of the resource blocks 46, with the vertical lined CRSs in subcarriers 3, 6, 9, and 12, the horizontal lined CRSs in subcarriers 2, 5, 8, and 11, and the checkerboard lined CRSs in subcarriers 1, 4, 7, and 10, of the first and fifth symbols 42. Additionally, the resource blocks 46 include PDCCH resource elements (gray) and PDSCH resource elements (white). The PDSCH REs (white) labeled with "1", "2", "3", etc., are meant to illustrate that different QAM symbols may be sent on the REs. For example, as explained below with respect to the method 500, some REs within the resource block 46 may be transmitted using QAM while others may be transmitted using 16QAM/QPSK.

It is likely that the PDSCH of the transmission node may collide with the CRS of a different transmission node in scenario 3. In scenario 3, each eNB has a different cell ID that results in a different CRS frequency shift. Under the LTE standard, the user equipment is configured in one of several different transmission modes, which defines how to process data transmissions received on the PDSCH. The major features of transmission mode 9, for example, are that the channel state information reference signal (CSI-RS) for CQI/PMI feedback is sparse, the user equipment-specific reference signal (UERS) for demodulation may be beamformed, and there may be as many as eight spatial streams.

In PDSCH transmission mode 9, UERSs with precoding are applied for coherent detection. Therefore, UE-specific beamforming weights are applied on the PDSCH resource elements and may vary across time and frequency. When the CRS with constant beamforming weights collides with the PDSCH with varying beamforming weights, strong interference occurs. That is, a legacy receiver cannot detect the PDSCH in the presence of the CRS interference. The joint transmission is thus compromised by collided resource elements.

Figure 5:
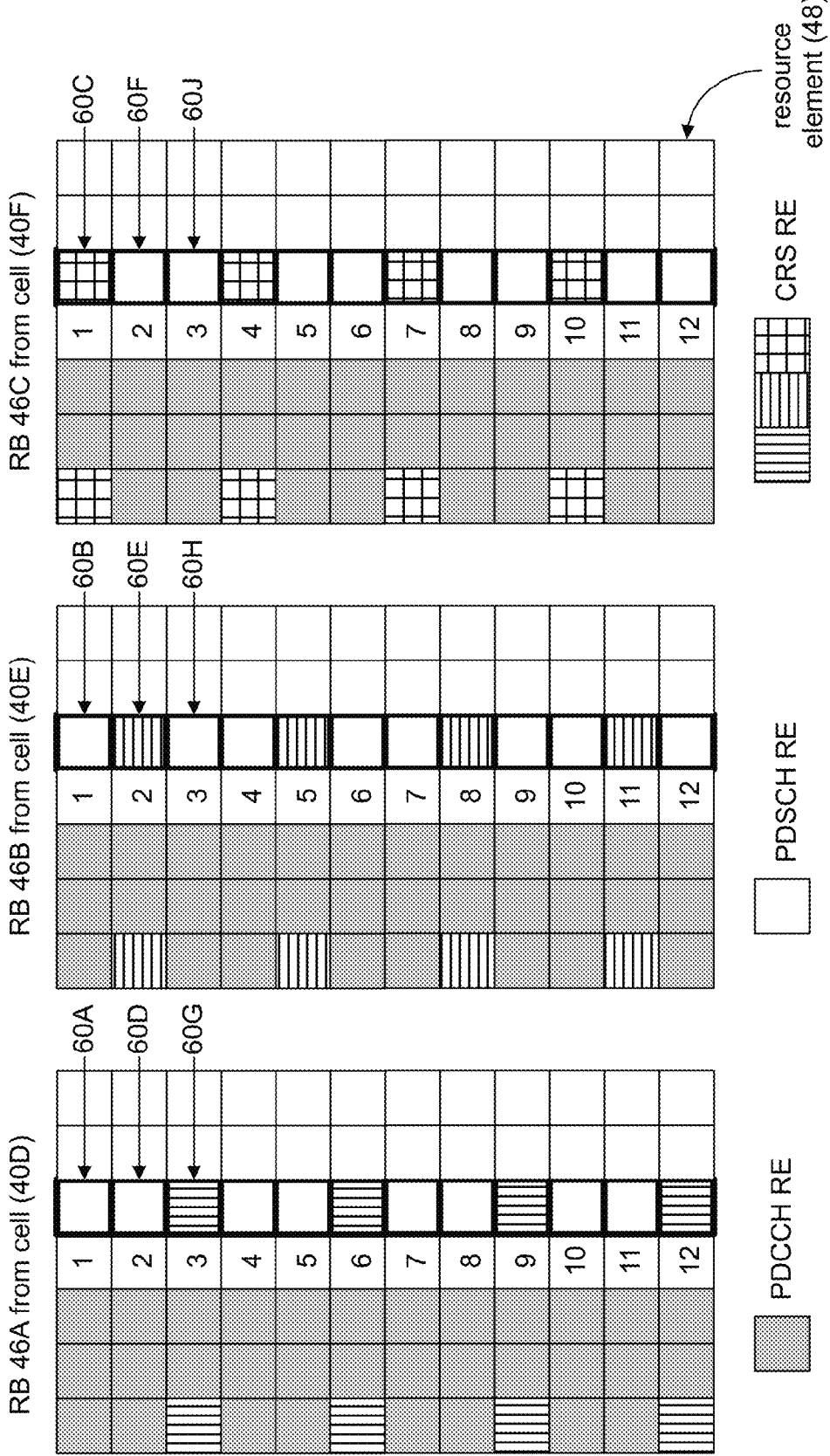
FIG. 5 is a block diagram showing PDSCH resource elements colliding with CRS resource elements of a resource block, according to some embodiments.

FIG. 5 shows the colliding resource elements caused by interference between PDSCH REs and interfering CRSs in resource blocks 46A-46C. All colliding resource elements are outlined in thick black lines. There are twelve collided REs, each RE in the fifth symbol of the resource block 46.

In the first three subcarriers, the collided resource elements 60A, ..., 60J (collectively, "collided resource elements 60") caused by the interfering CRSs are shown. Looking at resource element 48 in the first subcarrier, fifth symbol, denoted 60A, 60B, and 60C, the resource blocks 46A and 46B are both occupied by PDSCH resource elements (white), while the resource block 46C includes the CRS resource element (checkerboard lines).

Similarly, looking at resource element 48 in the second subcarrier, fifth symbol, denoted 60D, 60E, and 60F, the resource blocks 46A and 46C include the PDSCH resource elements, while the resource block 46B includes the CRS resource element (horizontal lines). The resource element 48 in the third subcarrier, fifth symbol, denoted 60G, 60H, and 60J, is occupied by PDSCH resource elements in resource blocks 46B and 46C, while the resource block 46A has the CRS resource element (vertical lines).

The collided resource elements problem also exists for each succeeding subcarrier position in the fifth symbol. Despite the presence of CRSs also in the first column (symbol period) of the resource blocks 46, no such collided resource element problem exists in the first downlink slot of the resource block 46 because the PDCCH resource elements do not exhibit interference with CRSs.

Figure 6:
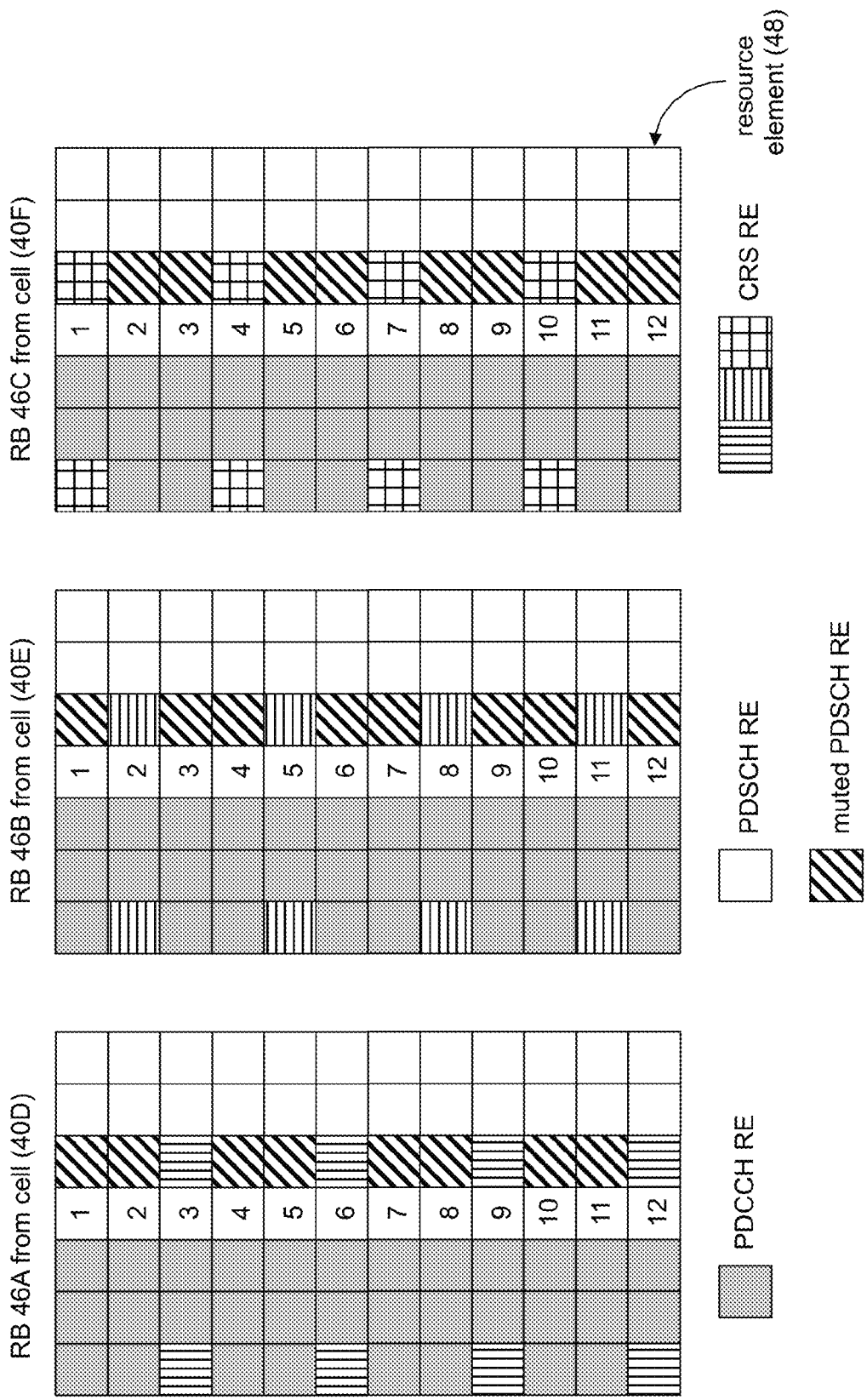
FIG. 6 is a block diagram of the three resource blocks of FIG. 5, in which the PDSCH of collided resource blocks are muted, according to some embodiments.

The most straightforward solution is to put the PDSCH resource elements that collide with the CRSs on mute, so as to reduce the interference. FIG. 6 shows the three resource blocks, this time with the PDSCH resource elements in the fifth symbol muted (diagonal lines).

Despite solving the interference problem, since the muted resource elements do not transmit the PDSCH, the available resource elements for PDSCH transmission decreases, resulting in a lower throughput. Another drawback of muting the PDSCH resource elements is that, because the interfering PDSCH is muted, legacy user equipment may underestimate the interference level on the measured CRS resource elements.

Since muting the PDSCH has drawbacks, cancelling the CRS interference on the collided resource elements 60 is desirable. In some embodiments, the PDSCH resource element mapping method for three-cell joint transmission 200 employs one or more of three schemes for solving the above problem.

Scheme 1: Transmit One PDSCH Symbol Over Three Consecutive CRS-Collided PDSCH Resource Elements (FIG. 7)

The transmission of one PDSCH resource element 46 over three CRS-collided resource elements 60 can be expressed in the following equation:

$$\begin{cases} \bar{y}_3^k = H_1^k P_1 \bar{s} + H_2^k P_2 \bar{s} + H_3^k \bar{e}_3 r_3 + \bar{n}_3 \\ \bar{y}_2^k = H_1^k P_1 \bar{s} + H_2^k \bar{e}_2 r_2 + H_3^k P_3 \bar{s} + \bar{n}_2 \\ \bar{y}_1^k = H_1^k \bar{e}_1 r_1 + H_2^k P_2 \bar{s} + H_3^k P_3 \bar{s} + \bar{n}_1 \end{cases} \quad (1)$$

where $\bar{y}_i^k$ is the received vector when the eNB 30 of cell i sends the CRS $r_i$ and the eNBs of the remaining joint transmission cells send data (vector or symbol) $\bar{s}$; k is the index of the resource element; $r_i$ is the CRS sent by the eNB of cell i; $H_i^k$ is the channel matrix of the downlink channel from the cell i eNB 30 to the user equipment 20; $P_i$ is the beamforming matrix for sending the data $\bar{s}$ from the cell i eNB 30 to the user equipment 20; $\bar{e}_i$ is the antenna selection vector that is an all zero vector, except the $i^{th}$ element is one, e.g. $[1\ 0 \ldots 0]^T$ for cell i eNB to send its CRS; and $\bar{n}_i$ is the noise vector seen by the user equipment 20 when the eNB of cell i sends the CRS $r_i$.

In some embodiments, the full beamforming matrix of the joint transmission on the non-collided resource elements 48 is $$P = \begin{bmatrix} P_1 \\ P_2 \\ P_3 \end{bmatrix}.$$

The full beamforming matrixes of the joint transmission on the collided resource elements are $$\begin{bmatrix} P_1 \\ P_2 \\ P_0 \end{bmatrix}, \begin{bmatrix} P_1 \\ 0 \\ P_3 \end{bmatrix} \text{ and } \begin{bmatrix} 0 \\ P_2 \\ P_3 \end{bmatrix}$$

with $$P = \frac{\left( \begin{bmatrix} P_1 \\ P_2 \\ P_0 \end{bmatrix} + \begin{bmatrix} P_1 \\ 0 \\ P_3 \end{bmatrix} + \begin{bmatrix} 0 \\ P_2 \\ P_3 \end{bmatrix} \right)}{2},$$

corresponding to the three parts of P, respectively. In other words, the user equipment 20 observes different parts of the full beamformed channel on each collided resource element 60.

After cancelling the CRS interference from the collided REs 60, the user equipment can combine the three partial observations to get the full observation of data $\bar{s}$ as:

$$\bar{y}^k = (\bar{y}_1^k + \bar{y}_2^k + \bar{y}_3^k)/2 = [H_1^k \quad H_2^k \quad H_3^k] \begin{bmatrix} P_1 \\ P_2 \\ P_3 \end{bmatrix} \bar{s} + \bar{n} \quad (2)$$

In some embodiments, $H^k=[H_1^k\ H_2^k\ H_3^k]$ is the full channel matrix for joint transmission on the $k^{th}$ resource element, and $$P = \begin{bmatrix} P_1 \\ P_2 \\ P_3 \end{bmatrix}$$

is the beamforming matrix for the non-collided resource elements 48. Finally, the user equipment 20 can use the user equipment-specific reference signal (UERS) to coherently decode the PDSCH, by using the observations from both collided 60 and non-collided 48 resource elements.

FIG. 7 is a block diagram illustrating the first scheme, according to some embodiments. The resource blocks 46A-46C from FIG. 5 are shown. Looking at the first three subcarriers, the PDSCH and CRS are both sent on the collided resource elements 70A-70J (collectively, "collided REs 70"), which include each of the resource elements 48 in the fifth symbol period (column 5). In some embodiments, using equation (1), above, the receiver of the UE is able to perform successive interference cancellation to decode the PDSCH from the collided resource elements.

Looking at resource elements 48 in the first subcarrier, fifth symbol, denoted 70A, 70B, and 70C, the resource blocks 46A and 46B are both occupied by PDSCH resource elements (13, white), while the resource block 46C includes the CRS resource element (checkerboard lines). The three resource elements 70A, 70B, and 70C are collided.

Similarly, looking at resource elements 48 in the second subcarrier, fifth symbol, denoted 70D, 70E, and 70F, the resource blocks 46A and 46C include the PDSCH resource elements (13, white), while the resource block 46B includes the CRS resource element (horizontal lines). The three resource elements 70D, 70E, and 70F are collided. Looking at resource elements 48 in the third subcarrier, fifth symbol, denoted 70G, 70H, and 70J, the resource blocks 46B and 46C are occupied by PDSCH resource elements (13, white), while the resource block 46A has the CRS resource element (vertical lines). The three resource elements 70G, 70H, and 70J are collided.

Recall from FIG. 3 that three neighboring cells 40 in a wireless neighborhood may form a cluster, or CoMP set 50. Any given UE within the wireless neighborhood 100 technically resides within one of the three cells. However, the UE will coordinate with all three eNBs within the CoMP set 50. The UE estimates its channel direction to different eNBs by measuring reference signals transmitted by each eNB to the UE.

Thus, in FIG. 7, suppose that, just as in FIG. 3, the UE in question, known as UE 20, resides in cell 40E. The eNB 30D in the cell 40D will transmit the RB 46A to the UE 20 as well as to other UEs within the cell 40D. Because of CoMP, the UE in cell 40E will receive the RB 46A as well. Similarly, the eNB 30F in the cell 40F will transmit its RB 46C to UEs within the cell 40F, but the UE 20 in cell 40E will also receive the RB 46C. Thus, the UE 20 in cell 40E receives all three of the RBs 46A, 46B, and 46C in FIG. 7.

In addition to knowing the CRS RE (horizontal lines) for its own cell 40E, the UE 20 also knows the CRS RE (vertical lines) for the cell 40D and the CRS RE (checkerboard lines) for the cell 40F. Thus, upon receiving the three RBs 46A, 46B, and 46C, the UE 20 is able to subtract out the interfering CRS REs, using equation (1), and figure out, with certainty, the PDSCH REs. Because the transmissions by the eNBs in each cell 40D, 40E, and 40F are coordinated under CoMP, the UE 20 will receive each of the RBs in FIG. 7. Because PDSCH REs 13, 14, 15, and 16 are each transmitted in three different subcarriers, the UE 20, using the procedure of FIG. 9, below, is able to recover the PDSCH RE 13, 14, 15, and 16.

Other collided resource elements, such as those labeled "14", "15", and "16", as well as collided resource elements from the second downlink slot (not shown), may be processed in a similar manner. The total number of resource elements 48 available in a resource block 46 is 96 based on the proposed scheme, which is 14% more than is available for the resource element-muting example in FIG. 6.

Scheme 2: Transmit Two PDSCH Symbols Over Three Consecutive CRS-Collided PDSCH Resource Elements Define $M \triangleq [H_1^k P_1 S\ H_2^k P_2 S\ H_3^k P_3 S]$, with $S \triangleq [\bar{s}_1 \bar{s}_2]$, $\Gamma \triangleq [H_3^k \bar{e}_3 r_3 + \bar{n}_3\ H_2^k \bar{e}_2 r_2 + \bar{n}_2\ H_1^k \bar{e}_1 r_1 + \bar{n}_1]$, and $Y \triangleq [\bar{y}_3^k\ \bar{y}_2^k\ \bar{y}_1^k]$ where $\bar{y}_1^k$ is the received vector when the eNB 30 of cell i sends the CRS $r_i$ and the eNBs of the remaining joint transmission cells send data (vector or symbol) $\bar{s}$; k is the index of the resource element; $r_i$ is the CRS sent by the eNB of cell i; $H_i^k$ is the channel matrix of the downlink channel from the cell i eNB 30 to the user equipment 20; $P_i$ is the beamforming matrix for sending the data $\bar{s}$ from the cell i eNB 30 to the user equipment 20; $e_i$ is the antenna selection vector that is an all zero vector, except the $i^{th}$ element is one, e.g. $[1\ 0\ \ldots\ 0]^T$ for cell i eNB to send its CRS; and $\bar{n}_i$ is the noise vector seen by the user equipment 20 when the eNB of cell i sends the CRS $r_i$.

First, the transmission of two PDSCH resource elements over three consecutive CRS-collided resource elements 70 can be expressed as $Y=MG+\gamma$, where G is a matrix for loading the data S onto each collided resource element 70. In some embodiments, it is desirable that G has good properties, such as diversity order and constant power constraint, for detecting S. For avoiding interference to legacy user equipment, in some embodiments, the G matrix has blocks of zero sub-matrixes on the diagonal as $$G \triangleq \begin{bmatrix} A_1 & A_2 & 0 \\ B_1 & 0 & B_2 \\ 0 & C_1 & C_2 \end{bmatrix}, \quad (4)$$

where all the sub-matrixes in the expression are 2-by-1 and the matrix dimension is 6-by-3. In some embodiments, for supporting the interference measurement of a legacy UE, matrix pairs, i.e. $(A_1, A_2)$, $(B_1, B_2)$, $(C_1, C_2)$, have at least one non-zero matrix in each pair.

After cancelling the CRS interference, the result is $Y=MG+\Psi$ where $\Psi$ is the vector for noise and residual interference after cancelling. For low complexity, in some embodiments, a linear receiver W, is used such that $\hat{S}=FYW$ Therefore, $$E \triangleq \begin{bmatrix} I \\ I \\ I \end{bmatrix} = GW \quad (5)$$

Namely, $MGW=(H_1^k P_1+H_2^k P_2+H_3^k P_3)S$, where $H_1^k P_1+H_2^k P_2^k+H_3^k P_3$ can be estimated from the user equipment reference signals. By (4) and (5), the following is obtained:

$$\begin{cases} I = [A_1 \ A_2] \begin{bmatrix} W_1 \\ W_2 \end{bmatrix} \\ I = [B_1 \ B_2] \begin{bmatrix} W_1 \\ W_3 \end{bmatrix} \\ I = [C_1 \ C_2] \begin{bmatrix} W_2 \\ W_3 \end{bmatrix} \end{cases} \quad (6)$$

where $$W \triangleq \begin{bmatrix} W_1 \\ W_2 \\ W_3 \end{bmatrix}$$

and $W_i$ is 2-by-1.

In some embodiments, there are multiple solutions for (6). For example, $$[A_1 \ A_2] = \begin{bmatrix} 1 & 0 \\ 0 & 1 \end{bmatrix}, \begin{bmatrix} W_1 \\ W_2 \end{bmatrix} = \begin{bmatrix} 1 & 0 \\ 0 & 1 \end{bmatrix};$$

$$[B_1 \ B_2] = \begin{bmatrix} 1 & 0 \\ 1 & 1 \end{bmatrix}, \begin{bmatrix} W_1 \\ W_3 \end{bmatrix} = \begin{bmatrix} 1 & 0 \\ -1 & 1 \end{bmatrix};$$

$$[C_1 \ C_2] = \begin{bmatrix} 1 & -1 \\ 1 & 0 \end{bmatrix}, \begin{bmatrix} W_2 \\ W_3 \end{bmatrix} = \begin{bmatrix} 0 & 1 \\ -1 & 1 \end{bmatrix}; \text{ and}$$

$$G = \begin{bmatrix} 1 & 0 & 0 \\ 0 & 1 & 0 \\ 1 & 0 & 0 \\ 1 & 0 & 1 \\ 0 & 1 & -1 \\ 0 & 1 & 0 \end{bmatrix} \text{ and } W = \begin{bmatrix} 1 & 0 \\ 0 & 1 \\ -1 & 1 \end{bmatrix}.$$

The corresponding received signals are $$\begin{cases} \bar{y}_3^k = H_1^k P_1 \bar{s}_1 + H_2^k P_2 \bar{s}_2 + H_3^k \bar{e}_3 r_3 + \bar{n}_3 \\ \bar{y}_2^k = H_1^k P_1 (\bar{s}_1 + \bar{s}_2) + H_2^k \bar{e}_2 r_2 + H_3^k P_3 \bar{s}_2 + \bar{n}_2 \\ \bar{y}_1^k = H_1^k \bar{e}_1 r_1 + H_2^k P_2 (\bar{s}_1 + \bar{s}_2) - H_3^k P_3 \bar{s}_1 + \bar{n}_1 \end{cases} \quad (7)$$

where $\bar{y}_i^k$ is the received vector when the eNB 30 of cell i sends the CRS $r_i$ and the eNBs of the remaining joint transmission cells send a linear combination of data (vector or symbol) $\bar{s}_1$ and $\bar{s}_2$; k is the index of the resource element; $r_i$ is the CRS sent by the eNB of cell $H_i^k$ is the channel matrix of the downlink channel from the cell i eNB 30 to the user equipment 20; $P_i$ is the beamforming matrix for sending the data $\bar{s}$ from the cell i eNB 30 to the user equipment 20; $\bar{e}_i$ is the antenna selection vector that is an all zero vector, except the $i^{th}$ element is one, e.g. [1 0 . . . 0]T for cell i eNB to send its CRS; and $\bar{n}_i$ is the noise vector seen by the user equipment 20 when the eNB of cell i sends the CRS $r_i$.

The linear receiver is given by:

$$[\hat{s}_1 \ \hat{s}_2] = (H_1^k P_1 + H_2^k P_2 + H_3^k P_3)^{-h} [\bar{y}_3^k \ \bar{y}_2^k \ \bar{y}_1^k] \begin{bmatrix} 1 & 0 \\ 0 & 1 \\ -1 & 1 \end{bmatrix}. \quad (8)$$

Besides the fact that three cells are transmitting joint transmission signal using three different CRS shifts as shown in FIG. 7, it is also possible for three cells to transmit joint transmission signals using two different CRS shifts, as in FIG. 8. In the latter case, the solution is very similar two-cell joint transmission with two CRS shifts.

The CRS locations of the entire resource block form a pattern, as shown in FIG. 8. This pattern may be shifted (in the frequency domain) to avoid collision among neighboring eNBs. For example, one resource block 46 has twelve subcarriers. The first CRS of the resource block may show up in subcarrier 0 for eNB 1, the first CRS of eNB 2 may start from subcarrier 1, and the first CRS of eNB 3 may start from subcarrier 5.

The received signal over two consecutive resource elements 48 can be written as:

$$\begin{cases} \bar{y}_1^k = H_1^k P_1 \bar{s} + H_2^k \bar{e}_2 r_2 + H_3^k \bar{e}_3 r_3 + \bar{n}_1 \\ \bar{y}_2^k = H_1^k \bar{e}_1 r_1 + H_2^k P_2 \bar{s} + H_3^k P_3 \bar{s} + \bar{n}_2 \end{cases} \quad (9)$$

In some embodiments, the difference with two-cell joint transmission is that the user equipment 20 needs to cancel two shifts for one resource element and one shift for another resource element. As used herein, "cancel two shifts", means cancelling two collided CRSs from the neighboring eNBs. Since some data RE (PDSCH) may be collided by two neighboring eNBs' CRSs and others may be only collided by one neighboring eNB's CRS, the subtraction process may be slightly different, but the principle is the same as just doing sequential reconstruction and subtraction. The post CRS-IC combining and demodulation is the same as for two-cell joint transmission.

FIG. 8 shows the same three resource blocks 46A, 46B, and 46C from FIG. 7, according to some embodiments. This time, instead of having one PDSCH symbol over three consecutive CRS-collided PDSCH REs, there are two PDSCH symbols over three consecutive CRS-collided PDSCH REs. FIG. 8 thus demonstrates an example of three-cell joint transmission with two different CRS shifts. The PDSCH symbols are arranged with the CRS REs according to equation (7), in some embodiments.

Looking at the first three subcarriers, the PDSCH and CRS are both sent on the collided resource elements 70K-70T (collectively, "collided REs 70"), which include each of the resource elements 48 in the fifth symbol period (column 5). In some embodiments, using equation (7), above, the receiver of the UE is able to perform successive interference cancellation to decode the PDSCH from the collided resource elements.

Looking at resource elements 48 in the first subcarrier, fifth symbol, denoted 70K, 70L, and 70M, the resource block 46A is occupied by a first PDSCH resource element (13, white) the resource block 46B is occupied by a second PDSCH resource element (14, white), while the resource block 46C includes the CRS resource element (checkerboard lines). The three resource elements 70K, 70L, and 70M are collided.

Similarly, looking at resource elements 48 in the second subcarrier, fifth symbol, denoted 70N, 70P, and 70Q, the resource block 46A is occupied by a sum of two resource elements (13+14, white) and the resource block 46C is occupied by the PDSCH resource element (14, white), while the resource block 46B includes the CRS resource element (horizontal lines). The three resource elements 70N, 70P, and 70Q are collided. Looking at the resource elements 48 in the third subcarrier, fifth symbol, denoted 70R, 70S, and 70T, the resource block 46B is occupied by a sum of two PDSCH resource elements (13+14, white), the resource block 46C is occupied by a single resource element (−13, white), while the resource block 46A has the CRS resource element (vertical lines). The three resource elements 70R, 70S, and 70T are collided.

The first three subcarriers of the fifth symbol are outlined with a thick black line. Two PDSCH symbols, 13 and 14, are transmitted in the first three subcarriers. As in the first scheme, the UE receiving the RBs has enough information to extract the PDSCH symbol 13 and the PDSCH symbol 14, by performing the operations of FIG. 9, as described below. The three eNBs 30D, 30E, and 30F (forming cluster 50B as in FIG. 3) are jointly transmitting the RBs 46A, 46B, and 46C, respectively. In the first subcarrier, the first eNB 30D sends data symbol, $s_1$ (13), which may be characterized mathematically as $1 \times s_1 + 0 \times s_2$, the second eNB 30E sends data symbol, $s_2$ (14), which may be characterized as $0 \times s_1 + 1 \times s_2$, and the third eNB 30F sends its CRS (checkerboard lines). In the second subcarrier, the first eNB 30D sends data symbol, $s_1+s_2$ (13+14), the second eNB 30E sends its CRS (horizontal lines), and the third eNB 30F sends data symbol, $s_2$ (14), which may be characterized as $0 \times s_1 + 1 \times s_2$. In the third subcarrier, the first eNB 30D sends its CRS (vertical lines), the second eNB 30E sends data symbol, $s_1+s_2$ (13+14), and the third eNB 30F sends data symbol, $-s_1$ (−13), which may be characterized as $-1 \times s_1 + 0 \times s_2$. Thus, while one eNB sends its CRS on a collided RE, another eNB sends a linear combination of two data symbols on the same RE.

The next three subcarriers of the fifth symbol are outlined in dark gray. Two PDSCH symbols, 15, and 16, are transmitted in these subcarriers. The third set of subcarriers (outlined in light gray) contains PDSCH symbols 17 and 18, and the last set of subcarriers (black) contains PDSCH symbols 19 and 20. As with the first three subcarriers, the transmissions are based on equation (7), above.

Figure 9:
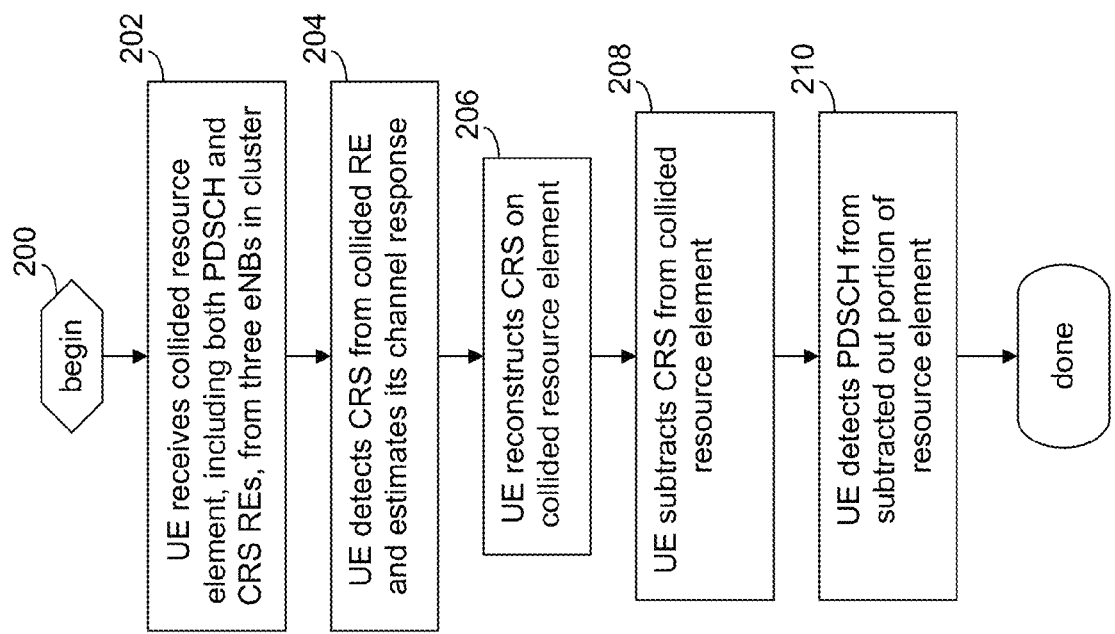
FIG. 9 is a flow diagram showing operations performed by the PDSCH resource element mapping method of FIG. 1, from the perspective of the UE, according to some embodiments.
Figure 10:
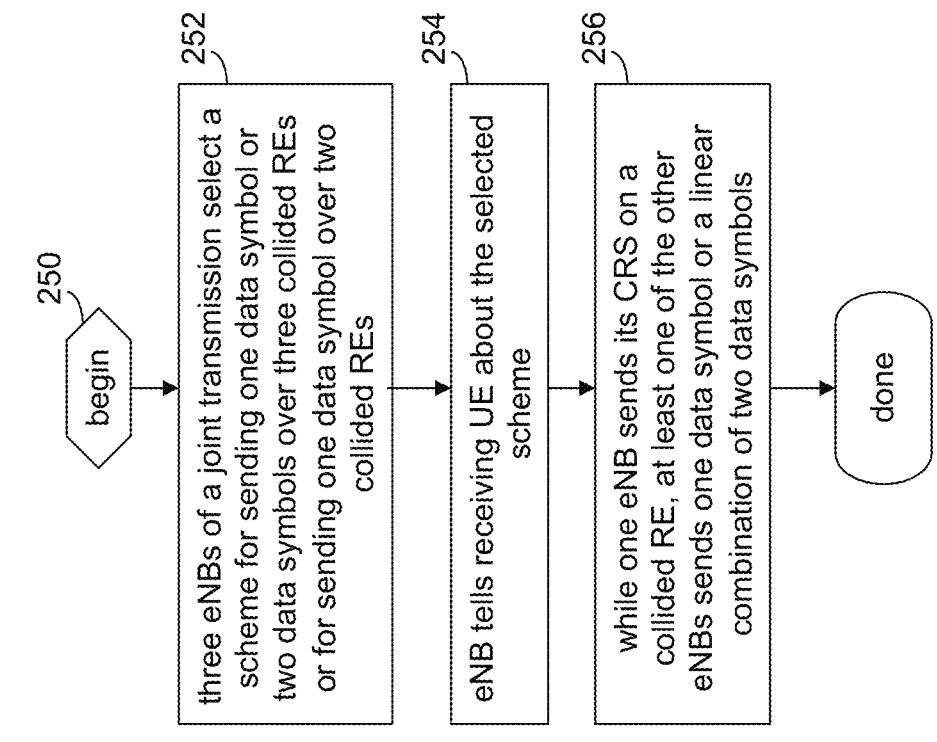
FIG. 10 is a flow diagram showing operations performed by the PDSCH resource element mapping method of FIG. 1, from the perspective of the eNBs in the cluster, according to some embodiments.

Before describing the third scheme 500 of the PDSCH resource element mapping method 200, FIGS. 9 and 10 are flow diagrams showing operations performed by the UE and eNB, respectively, in performing the two schemes embodied in FIGS. 7 and 8 and mathematically expressed by equations (1) and (7).

FIG. 9 is a flow diagram showing operations performed by the UE receiver in performing the above two schemes, in some embodiments. The first scheme, transmitting one PDSCH RE over three consecutive CRS-collided resource elements 300 (FIG. 7) and the second scheme, transmitting two PDSCH REs over three consecutive CRS-collided resource elements 400 (FIG. 8) are both managed by the UE receiver in a similar fashion. Using its knowledge about all three CRS REs in the cluster (vertical, horizontal, and checkerboard), as well as the channel characteristics, the UE receiver is able to perform successive interference cancellation, due to the collided resource elements 70.

First, the UE receiver 20 obtains the collided resource element 70, which includes both the CRS RE and the PDSCH RE, by receiving each resource block in FIG. 7 or in FIG. 8, RB 46A, RB 46B, and RB 46C (block 202). Next, the UE 20 detects the CRS RE and estimates its channel response (block 204). The UE 20 estimates the channel response of each channel transmitting the respective resource blocks using the CRS REs of all resource blocks 46. Thus, the UE 20 estimates the channel response for a first channel transmitting the first RB 46A from the eNB 30A based on the vertical lined CRS REs, the UE estimates the channel response for a second channel transmitting the second RB 46B from the eNB 30B based on the horizontal lined CRS REs, and the UE estimates the channel response for a third channel transmitting the third RB 46C from the eNB 30C based on the checkerboard lined CRS REs. In equations (1) and (7), the channel response is denoted by the symbol, $H_i^k$, the channel matrix of the downlink channel from the cell i eNB 30 to the user equipment 20.

Recall that both the eNB and the UE know what the cell-specific reference signal (CRS) is supposed to be. The UE 20, located in the cluster 50B (FIG. 3) knows the checkerboard lined CRS RE because the CRS resides in the cell 40N, which is part of the cluster 50B in which the UE resides. However, the UE 20 also knows the vertical lined CRS RE and the horizontal lined CRS RE, since these are part of the same cluster 50. The UE 20 also receives the PDSCH REs from RBs 46A and 46B. In equations (1) and (7), the CRS REs are denoted using the term, $r_i$, the CRS sent by the eNB of cell i. Thus, at this point, the UE 20 knows both the $H_i^k$ and the $r_i$ terms of equations (1) or (7), depending on which scheme is being used.

The received signal of the CRS RE on the collided resource element 70 is reconstructed (block 206). Reconstruction, as used in this context, means that the known elements ascertained by the UE 20 are multiplied together, as in equations (1) or (7). The $H_i^k$ and the $r_i$ terms are multiplied with either the antenna selection vector or the beamforming matrix, as appropriate. Recall from equations (1) and (7) that $P_i$ is the beamforming matrix for sending the data $\bar{s}$ from the cell i eNB 30 to the user equipment 20 while $\bar{e}_i$ is the antenna selection vector that is an all zero vector, except the $i^{th}$ element is one, e.g. $[1 \ 0 \ \ldots \ 0]^T$ for cell i eNB to send its CRS. The antenna selection vector, $\bar{e}_i$, is thus used to send the CRS REs, as the CRS REs are broadcast omnidirectionally (e.g., to all entities in the cluster 50). The beamforming matrix, $P_i$, by contrast, is used to send the PDSCH data to a specific UE, and is thus not broadcast, but is beamformed.

The reconstructed signal is then subtracted from the originally received signal (block 208). Finally, the remaining PDSCH data is detected in the subtracted out signal without the strong CRS interference (block 210). This means that, using equations (1) or (7), the desired PDSCH data signal, given by $\bar{s}$, is solved for by the UE receiver 20.

In some embodiments, the resource block 46 is jointly processed to extract the information within it. For example, the channel responses of the entire resource block 46 may be estimated from all the reference signals (e.g. UERS or CRS) of the resource block jointly. In some embodiments, the data of the resource block is also detected jointly, using all the data REs, including those initially corrupted by the neighboring cell CRS, but cleaned up by subtraction. Since channel coding (e.g., turbo code) is applied over the resource block, the likelihood information of each codebit gleaned from each data RE is sent to the turbo decoder for joint decoding.

For the example in FIG. 7, the PDSCH data is sent three times on three collided resource elements 70. Recall that every resource element 48 in the fifth symbol period is a collided resource element, due to the simultaneous transmission of CRS and PDSCH resource elements. As shown in FIG. 7, the PDSCH resource element, denoted "13", is sent with the first subcarrier (row 1), with the second subcarrier (row 2), and with the third subcarrier (row 3). These three resource element positions are outlined with a thick black rectangle in FIG. 7. Since the UE receiver is able to detect the CRS associated with its home eNB, as well as the CRSs of other cells 40 in the cluster 50, subtract the CRS from the collided resource element, and detect the PDSCH data, the interference problem is solved without having to mute all the PDSCH REs in the fifth symbol period, in some embodiments.

FIG. 7 shows where both the PDSCH and CRS REs are sent on the collided resource elements 70. Unlike the example in FIG. 6 in which the PDSCH resource elements 48 that are transmitted in the same resource element with the CRS are muted, in FIG. 7, two joint transmission cells can utilize the collided resource elements 70 to send the PDSCH RE.

The principle illustrated in FIG. 7 may be viewed as a spatial multiplexing operation between the CRS from one joint transmission cell and the PDSCH resource element from the other two joint transmission cells. Collided resource elements are denoted 70A-70J to illustrate the spatial multiplexing and to distinguish from the collided REs 60A-60J (FIG. 5). The PDSCH denoted "13" is sent on resource element 70A from cell 40D and on resource element 70B from cell 40E, while CRS is sent on resource element 70C from cell 40F. Thus, there is spatial multiplexing between the CRS of one joint transmission cell and the PDSCH resource elements from two joint transmission cells. The same PDSCH ("13") is also sent on the second and third subcarriers (rows). In each case, there are two PDSCH resource elements and one CRS occupying the same location in the resource block 40. A mathematical expression for using three contiguous CRS-collided PDSCH resource elements to transmit one PDSCH resource element is given in the equation (1).

Within a given resource block 46, each PDSCH resource element (e.g., "13") is repeated twice. In other words, each PDSCH resource element is transmitted three times. Thus, while the throughput is improved in the scenario of FIG. 7 over the muted PDSCH example (FIG. 6), there is still an opportunity to further improve the throughput.

FIG. 10 is a flow diagram showing the PDSCH resource element mapping method 200 of FIG. 1 from the perspective of the eNBs that make up a cluster performing joint transmission. The operations of FIG. 10 may, for example, be performed by the eNBs 30D, 30E, and 30F in the cluster 50B (FIG. 3).

The three eNBs making up the cluster select a scheme for joint transmission (block 252). The eNBs may send one data symbol over three collided REs, as in FIG. 7. Or, the eNBs may send two data symbols over three collided REs, as in FIG. 8. Or, the eNBs may send one data symbol over two collided REs. Once the transmissions have taken place, the eNBs each communicate with their receiving UE about the selected scheme (block 254). While one eNB sends its CRS on a collided RE, at least one of the other eNBs sends either one data symbol, as in FIG. 7, or a combination of two data symbols, as in FIG. 8 (block 256).

Scheme 3: Use a Modulation Order Lower than is Indicated by MCS for CRS-Collided Resource Elements (FIG. 11)

For the user equipment to operate at a very high SINR, a high modulation and coding scheme (MCS), which means high modulation order and high coding rate, may be selected for PDSCH transmission. The residual CRS interference after CRS cancellation may contribute more to a PDSCH decoding error than white noise at a high SINR. Further, the PDSCH transmitted with a high MCS is more sensitive to the interference, as compared with a PDSCH transmitted with a low MCS. Thus, the performance of a superimposed PDSCH transmission with CRS cancellation may be worse than with the PDSCH muting scheme described above (FIG. 6).

A possible alternative to alleviate the PDSCH decoding error is to use a lower modulation order compared with the MCS fed back by the UE in the REs that are interfered with by the CRS (e.g., resource elements 13-16 in FIG. 7 or resource elements 13-20 in FIG. 8), and use the modulation order indicated by the fed back MCS in the normal resource elements that are not polluted by the CRS resource element (e.g., non-collided REs).

For example, if the user equipment 20 feeds back an MCS corresponding to 64QAM, the eNB 30 can use 16QAM/QPSK in the resource elements polluted by the CRS and keep 64QAM in the other (noncollided) resource elements. FIG. 11 illustrates this principle, according to some embodiments. CRS-collided REs occupying the fifth symbol period are transmitted using 16 QAM/QPSK, while the remaining non-collided REs (e.g., REs occupying all other symbol periods) are transmitted using 64 QAM.

In some embodiments, the eNB makes corresponding changes in its rate matching procedure, and this special process may be indicated to the user equipment through RRC signaling. (RRC is short for radio resource control, and is one of the control layers in LTE.) Rate matching is the puncturing and repetition of codebits (or encoded bits) such that the processed codebits can be loaded on the usable REs for carrying the codebits. The number of the usable REs may vary for a number of reasons. Some REs may be used for sending CRSs such that they cannot be used to send other signals.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method comprising:
    receiving, by a user equipment (UE) in a cluster, a joint transmission comprising a plurality of resource blocks (RBs) from multiple respective base stations (eNBs) in the cluster, each RB comprising a plurality of physical downlink shared channel (PDSCH) resource elements (REs), wherein:
        a first eNB transmits a first RB of the at least two RBs, the first transmission comprising:
            a cell-specific reference signal (CRS) at a first RE location of the first RB, wherein the first RE location comprises a subcarrier and symbol period of the RB; and
            a linear combination of multiple symbols at a second location of the first RB, wherein the first and second RE locations occupy the same symbol period of the RB;
        a second eNB transmits a second RB of the plurality of RBs, the second transmission comprising:
            a second CRS at the second RE location of the second RB; and
            a linear combination of the multiple symbols at the first location of the second RB;
    extracting, by the UE, a linear combination of the multiple symbols from the joint transmission;
    detecting, by the UE, the first CRS from the first RB, wherein the UE employs the first CRS to estimate a first channel response of a first channel disposed between the UE and the first eNB;

detecting, by the UE, the second CRS from the second RB, wherein the UE employs the second CRS to estimate a second channel response of a second channel disposed between the UE and the second eNB; and detecting, by the UE, a third CRS from a third RB, wherein the UE employs the third CRS to estimate a third channel response of a third channel disposed between the UE and a third eNB;

multiplying, by the UE, the first channel response by the first CRS, resulting in a first reconstructed CRS;

multiplying, by the UE, the second channel response by the second CRS, resulting in a second reconstructed CRS; and multiplying, by the UE, the third channel response by the third CRS, resulting in the third reconstructed CRS.

2. The method of claim 1, wherein the linear combination of the multiple symbols is given by:

$$c_1*s_1+c_2*s_2+\ldots+c_N*s_N,$$

wherein $c_1, c_2, \ldots, c_N$ are complex coefficients including zero and one and $s_1, s_2, \ldots, s_N$ are symbols of interest used to perform channel estimation or provide data information.

3. The method of claim 1 further comprising:
subtracting, by the UE, first, second, and third reconstructed CRSs from the joint transmission.

4. The method of claim 1 further comprising:
using, by the UE, the following equation to detect a data signal, given by $\bar{s}$, from the joint transmission:

$$\begin{cases} \bar{y}_3^k = H_1^k P_1 \bar{s} + H_2^k P_2 \bar{s} + H_3^k \bar{e}_3 r_3 + \bar{n}_3 \\ \bar{y}_2^k = H_1^k P_1 \bar{s} + H_2^k \bar{e}_2 r_2 + H_3^k P_3 \bar{s} + \bar{n}_2 \\ \bar{y}_1^k = H_1^k \bar{e}_1 r_1 + H_2^k P_2 \bar{s} + H_3^k P_3 \bar{s} + \bar{n}_1 \end{cases}$$

where $\bar{y}_i^k$ is a received vector when an eNB of cell i sends CRS $r_i$ and the eNBs of the remaining joint transmission cells send data $\bar{s}$; k is the index of the resource element; $r_i$ is the CRS sent by the eNB of cell i; $H_i^k$ is the channel matrix of the downlink channel from the cell i eNB to the UE; $P_i$ is a beamforming matrix for sending the data s from the cell i eNB to the UE; $\bar{e}_i$ is an antenna selection vector for cell i eNB to send its CRS; and $\bar{n}_i$ is a noise vector seen by the UE when the eNB of cell i sends the CRS $r_i$.

5. The method of claim 1, further comprising:
using, by the UE, the following equation to detect the linear combination of two data signals, given by $\bar{s}_1$ and $\bar{s}_2$, from the joint transmission:

$$\begin{cases} \bar{y}_3^k = H_1^k P_1 \bar{s}_1 + H_2^k P_2 \bar{s}_2 + H_3^k \bar{e}_3 r_3 + \bar{n}_3 \\ \bar{y}_2^k = H_1^k P_1 (\bar{s}_1 + \bar{s}_2) + H_2^k \bar{e}_2 r_2 + H_3^k P_3 \bar{s}_2 + \bar{n}_2 \\ \bar{y}_1^k = H_1^k \bar{e}_1 r_1 + H_2^k P_2 (\bar{s}_1 + \bar{s}_2) - H_3^k P_3 \bar{s}_1 + \bar{n}_1 \end{cases}$$

where $\bar{y}_i^k$ is a received vector when an eNB of cell i sends CRS $r_i$ and the eNBs of the remaining joint transmission cells send the linear combinations of two data signals $\bar{s}_1$ and $\bar{s}_2$ k is the index of the RE; $r_i$ is the CRS sent by the eNB of cell i; $H_i^k$ is the channel matrix of the downlink channel from the cell i eNB to the UE; $P_i$ is a beamforming matrix for sending the linear combination of two data signals data $\bar{s}_1$ and $\bar{s}_2$ from the cell i eNB to the UE; $\bar{e}_i$ is an antenna selection vector for cell i eNB to send its CRS; and $\bar{n}_i$ is a noise vector seen by the UE when the eNB of cell i sends the CRS $r_i$.

* * * * *